United States Patent [19]

Yamamoto et al.

[11] Patent Number: 5,348,452
[45] Date of Patent: Sep. 20, 1994

[54] PUMP MOUNTING STRUCTURE OF CANNED SUBMERSIBLE MOTOR FOR DEEP WELL PUMP

[75] Inventors: Masakazu Yamamoto; Hiromi Sakacho; Seiichirou Yamada, all of Tokyo, all of Japan

[73] Assignee: Ebara Corporation, Tokyo, Japan

[21] Appl. No.: 89,631

[22] Filed: Jul. 12, 1993

Related U.S. Application Data

[63] Continuation of Ser. No. 728,214, Jul. 12, 1991, abandoned.

[30] Foreign Application Priority Data

Jul. 13, 1990 [JP] Japan ................. 2-73883

[51] Int. Cl.⁵ ................. F04B 17/00; F04B 39/06
[52] U.S. Cl. ................. 417/422; 417/423.3; 417/423.8; 417/423.14
[58] Field of Search ............ 417/423.3, 423.7, 423.8, 417/423.12, 423.14, 423.15, 424.1, 424.2, 422

[56] References Cited

U.S. PATENT DOCUMENTS 4,930,996  6/1990  Jensen et al. ............ 417/423.8
5,028,218  7/1991  Jensen et al. ............ 417/423.3

Primary Examiner—Richard A. Bertsch
Assistant Examiner—Alfred Basichas
Attorney, Agent, or Firm—Nikaido, Marmelstein, Murray & Oram

[57] ABSTRACT

A pump mounting structure of a canned submersible motor for a deep well pump is disclosed. The motor comprises a stator chamber and bearing brackets provided on opposite sides of the stator chamber. The bearing bracket on a load side of the motor includes a pump mounting flange for supporting the pump thereon. The improvement consists of a pump suction port being formed in the load side bearing bracket to thereby make the load side bearing bracket serve as a pump suction casing, and of the pump mounting flange being constituted as a pump body mounting flange. By this means, heat generated in the stator chamber is dissipated efficiently by the water passing through the suction port provided in the bearing bracket. Also, as a pump suction casing is not necessary, an axial length of the pump can be shortened and the number of parts can be reduced.

7 Claims, 3 Drawing Sheets

PUMP MOUNTING STRUCTURE OF CANNED SUBMERSIBLE MOTOR FOR DEEP WELL PUMP

This application is a continuation of application Ser. No. 07/728,214 filed Jul. 12, 1991, now abandoned.

BACKGROUND OF THE INVENTION

1. Field of the Invention:

The present invention relates to a canned submersible motor for a deep well pump, and is particularly concerned with a pump mounting structure of the canned motor.

2. Prior Art

A canned submersible motor for a deep well pump is well known and a typical example of such a motor mounted on a pump is shown in FIG. 2.

As is shown generally in FIG. 2, a prior art deep well pump has a suction port 103 provided at a mounting part positioned between an upper pump element 101 and a lower motor element 102, and thus when the pump operates, water in a deep well is sucked in from the suction port 103 as indicated by arrows, pressurized by the multistage pump element 101, and fed externally from an upper discharge port 104 through a discharge pipe not shown.

FIG. 3 is a longitudinal sectional view of a prior art canned submersible motor for a deep well pump corresponding to the aforementioned motor element 102. In the illustration, the motor comprises a stator chamber constructed integrally by welding a stator core 111, a frame or outside can 112, an inside can 113, a load side (or pump mounting side) end plate 114 and a counter load side end plate 115 to each other, bearing brackets 116 and 117 mounted on a load side and a counter load side of the stator chamber respectively for supporting a shaft 119 and a radial bearing 124, 125, a rotor 118 and the shaft 119 constructing a rotator, a downward thrust bearing 120 for supporting the rotator axially, and a thrust bearing case 121 for containing the thrust bearing 120.

A motor mounting flange 122a of a pump suction casing 122 indicated by a two-dot chain line is mounted on a pump mounting flange 116a of the bearing bracket 116 of the motor, and thus at the time of pump operation, water is sucked in from a pump suction port 122b of the pump suction casing 122 toward an inlet port of a pump body (not shown) as indicated by arrows. In the illustration, a reference numeral 111a denotes a stator coil winding and 123 denotes a power cable.

In the above-described prior art canned motor for deep well pump, however, since the suction port 122b is provided on the pump suction casing 122 which is in turn mounted on the bearing bracket 116, at the time of operation, pumped-out water flows at a position far away from the heat source, i.e. a stator coil winding 111a, by way of the load side end plate 114, the bearing bracket 116 and the motor mounting flange 122a of the pump inlet casing 122, therefore almost no cooling effect is exerted on the winding 111a.

Further, since the suction casing 122 and the bearing bracket 116 are axially connected, an axial length of a total unit will inevitably become too long.

SUMMARY OF THE INVENTION

An object of the present invention is, therefore, to provide a canned motor for a deep well pump wherein, in addition to heat radiation from an outer peripheral portion of the outside can, a cooling effect from the load side can be enhanced, further an axial length of the total unit can be shortened, and the number of parts can be reduced.

In order to attain the aforementioned object, in a canned submersible motor for a deep well pump, the present invention is characterized in that a pump suction port is formed in a load side bearing bracket, thereby making the bearing bracket serve as a suction casing having a pump suction port. A second aspect of the invention is characterized in that a load side end plate and a bearing bracket are structured integrally with each other, and a pump suction port is formed by the bearing bracket and the load side end plate.

Since the present invention is constructed as described above, the pump suction casing can be omitted and the pump mounting flange of the canned submersible motor can be constituted as a pump body mounting flange which is formed on a load side (pump side) end surface of the bearing bracket having a pump suction inlet port therein.

Consequently, heat generated from a winding of the stator coil is cooled efficiently by water flowing in the pump suction port formed in the bearing bracket without being interrupted by the motor mounting flange of the pump and the pump mounting flange of the motor which are provided on the load side bearing bracket end portion in the prior art structure, and hence a cooling effect of the stator chamber from the pump side or the load side is enhanced.

Further, when the load side end plate and the bearing bracket are structured integrally with each other, and the pump suction port is formed from the end plate and the bearing bracket, then heat generated from a winding of the stator chamber at the time of operation is dissipated directly by the water flowing over the end plate forming the stator chamber, therefore cooling is further enhanced.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENTS

Next, a preferred embodiment of the present invention will be described with reference to the accompanying drawings.

Figure 1:
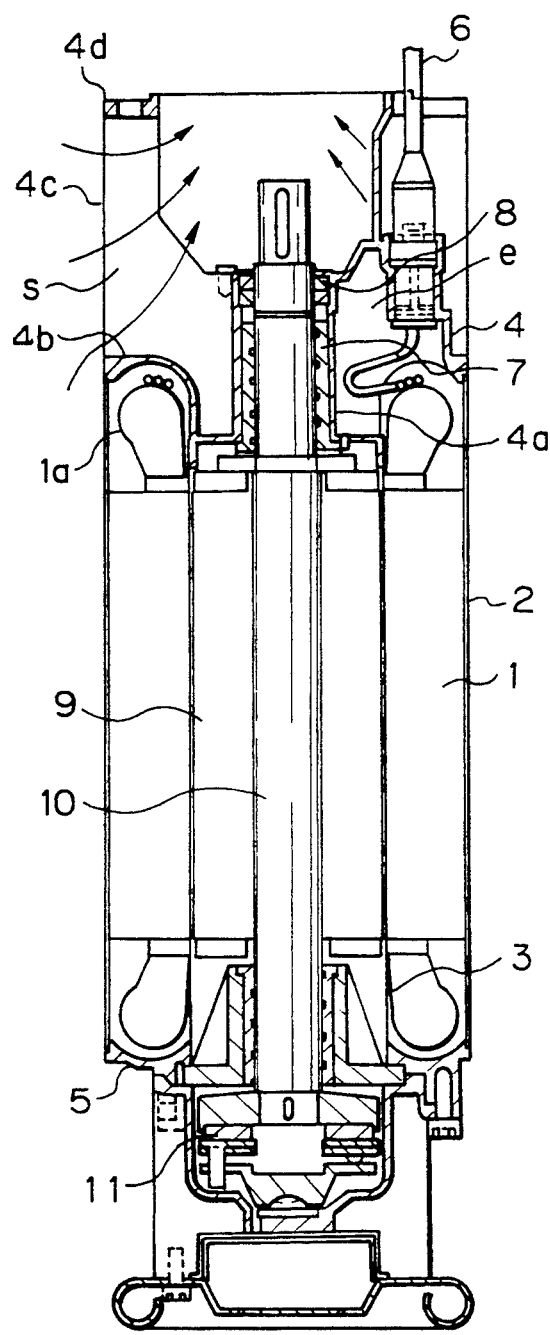
FIG. 1 is a longitudinal sectional view of a canned submersible motor for a deep well pump which is given in one embodiment of the present invention.
Figure 2:
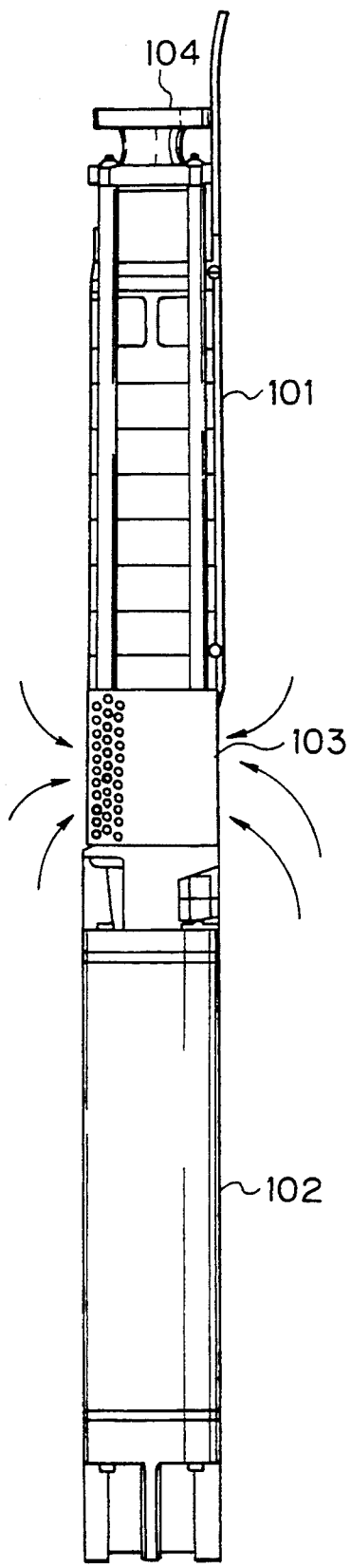
FIG. 2 is a general view exemplifying a prior art deep well pump and a canned submersible motor.

FIG. 1 is a longitudinal sectional view of a canned submersible motor for a deep well pump which is given in one embodiment of tile present invention.

Figure 3:
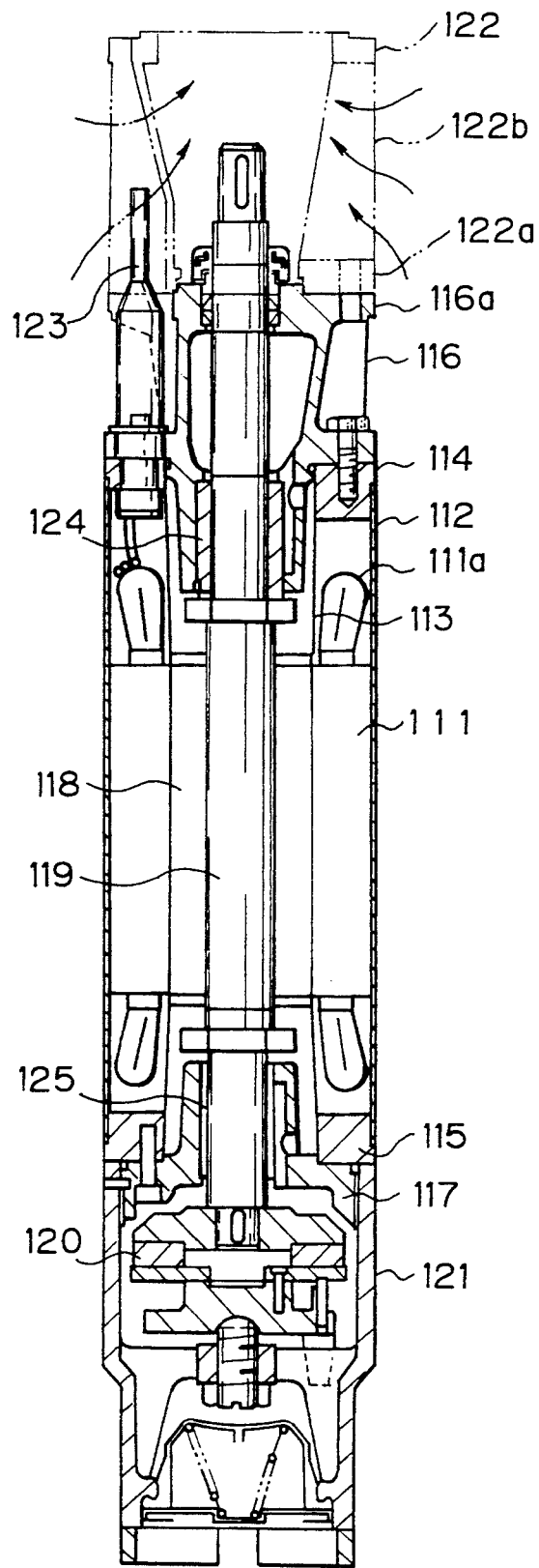
FIG. 3 is a longitudinal sectional view exemplifying a prior art canned submersible motor for deep well pump.

In the illustration, the stator chamber comprises a stator core 1, a frame or outside can 2, an inside can 3, a load side (power cable extraction side) end plate 4 and a counter load side end plate 5 which are constructed integrally with each other through welding as in the case of prior art (FIG. 3). However, in the embodiment shown, the load side end plate 4 is structured integrally with the bearing bracket of the prior art (116 in FIG. 3), a mounting part for a power cable 6 is formed at the upper and radially outer portion thereof and a bearing boss 4a for mounting a radial bearing 7 and a shaft seal 8 is formed integrally at the central portion thereof, and the load side end plate 4 integrally formed with the bearing bracket is structured to serve as the suction casing containing the pump suction port S. Further the upper end portion of the inside can 8 is welded to the inner end portion of the bearing boss 4a of the bearing bracket integrally formed with the load side end plate 4.

A pump mounting flange 4d is mounted on a plate portion 4b defining a load side end portion of the stator chamber through a rib 4c, whereby the pump body mounting flange 4d. is formed on the load side end of the bearing bracket. Then, in the illustration, a reference numeral 9 denotes a rotor, 10 denotes a shaft, and 11 denotes a thrust bearing.

Since the construction is such as described above, heat generated from a winding 1a in the stator chamber is dissipated directly by the water flowing through the pump suction port S positioned directly above the end plate portion 4b as indicated by arrows, thus enhancing a cooling action.

Also, since a space e between the end plate 4 and the upper end surface of the stator core 1 around the bearing boss 4a is expanded radially inward as far as the outer surface of the bearing boss 4a can be taken relatively wide, space is available for providing an extraction port of the power cable 6 out of the stator chamber and also for connecting the cable 6 and the stator winding 1a therein. Further since a pump suction casing is not particularly required in addition to the bearing bracket unlike in the prior art structure, not only the unit can be shortened axially but also the number of parts can be reduced.

As described above, according to the embodiment shown, the following effects will be ensured:

(i) A pump suction port is formed in a load side bearing bracket of a canned submersible motor for a deep well pump, and the bearing bracket is made to serve as a suction casing having a pump suction port, therefore a pump mounting flange can be constituted as a pump body mounting flange and can be formed on a load side (pump side) end surface of the pump suction port of the bearing bracket, and thus the mounting flanges for a pump and a motor formed on the load side bearing bracket end portion in the prior art structure will not particularly be required. Therefore, heat generated from a winding in the stator chamber at the time of operation is dissipated efficiently by the water passing through the pump suction port formed in the load side bearing bracket, and a cooling effect from the load side of the stator chamber can be enhanced accordingly.

(ii) Since a pump suction casing is not required in addition to the bearing bracket, not only an axial length of the unit can be shortened but also the number of parts can be reduced.

(iii) Since the load side end plate forming the stator chamber and the bearing bracket are structured integrally with each other to form a suction casing having the pump suction port, the pump suction port is positioned directly above the winding in the stator chamber which acts as a heating source, and thus a cooling effect from the load side of the stator chamber can further be enhanced.

(iv) Since the upper end portion of the inside can is welded to the inner end portion of the bearing boss of the bearing bracket integrally formed with the load side end plate, the axial length of the inside can be shortened and, therefore, the axial length of the unit can be further shortened.

(v) Since the stator space between the load side end plate and the upper surface of the stator core around the bearing boss can be made relatively wide, space is readily available for providing an extraction port of the power cable and also for connecting the cable and the stator winding therein without axially elongating the stator chamber.

Although in the illustrated embodiment the load side end plate is integrally formed with the bearing bracket, they can be formed separately, and even if they are formed separately, the above effects (i) and (ii) can be obtained.

What is claimed is:

1. In a pump mounting structure of a canned submersible motor for a deep well pump, said motor comprising a stator chamber and bearing brackets provided on opposite sides of said stator chamber, one of said bearing brackets disposed on a load side of said motor includes a pump mounting flange for supporting said pump thereon; said stator chamber comprises a stator core, an outside can, an inside can, a load side end plate, and a counter load side end plate which are constructed integrally with each other, wherein said load side end plate comprises a single shell structure covering around a winding of said stator core, said load side bearing bracket comprises a bearing boss extending from a radially inner end of said load side end plate toward said pump mounting flange defining a water channel between said end plate and said bearing boss, and wherein said load side end plate and said pump mounting flange are integrally formed with said bearing boss of said load side bearing bracket whereby said end plate, said pump mounting flange, and said bearing boss serve as a pump suction casing defining a pump suction port, and wherein said pump mounting flange is constituted as a pump body mounting flange.

2. The pump mounting structure as defined in claim 1, wherein a mounting pant for a power cable of said motor is provided at the upper and radially outer portion of said bearing bracket, and a bearing boss for supporting a radial bearing and a shaft of said motor is formed integrally at the central portion of said bearing bracket.

3. The pump mounting structure as defined in claim 2, wherein the upper end portion of said inside can is welded to the inner end portion of said bearing boss formed on said bearing bracket.

4. The pump mounting structure as defined in claim 2, wherein said pump mounting flange is supported at the load side end or said bearing bracket through a rib provided on a plate portion defining a load side end of said stator chamber.

5. The pump mounting structure as defined in claim 2, wherein a stator space is provided between said load side end plate and upper end surface of said stator core and is expanded radially inward as far as the outer surface of said bearing boss.

6. The pump mounting structure as defined in claim 5, wherein a power cable extraction port out of said stator chamber is provided in said stator space.

7. The pump mounting structure as defined in claim 6, wherein said power cable and a winding of said stator coil is connected in said stator coil.

* * * * *